United States Patent
Noda et al.

(12) 
(10) Patent No.: US 6,736,258 B2
(45) Date of Patent: May 18, 2004

(54) APPARATUS FOR SUPPLYING RAW MATERIALS AT CONSTANT AMOUNTS

(75) Inventors: Keiji Noda, Nagoya (JP); Kisao Kadoi, Nagoya (JP); Yuji Ueda, Nagoya (JP)

(73) Assignee: NGK Insulators, Ltd. (JP)

( * ) Notice: Subject to any disclaimer, the term of this patent is extended or adjusted under 35 U.S.C. 154(b) by 174 days.

(21) Appl. No.: 10/082,140

(22) Filed: Feb. 26, 2002

(65) Prior Publication Data

US 2002/0162853 A1 Nov. 7, 2002

(30) Foreign Application Priority Data

Mar. 1, 2001 (JP) ........................................ 2001-056395

(51) Int. Cl.⁷ ............................................. B65G 65/34
(52) U.S. Cl. .................. 198/550.3; 198/532; 198/860.5
(58) Field of Search ........................ 198/550.01, 550.2, 198/550.3, 530, 532, 860.5

(56) References Cited

U.S. PATENT DOCUMENTS

| | | | | |
|---|---|---|---|---|
| 2,866,536 A | * | 12/1958 | Smallegan | ............... 198/550.3 |
| 4,093,066 A | * | 6/1978 | Mitchell et al. | ..... 198/860.5 X |
| 4,257,518 A | * | 3/1981 | Stock et al. | ......... 198/550.3 X |
| 5,161,678 A | * | 11/1992 | Garvey | ..................... 198/860.5 |
| 5,657,902 A | * | 8/1997 | Kraus | ..................... 198/532 X |
| 5,701,992 A | * | 12/1997 | Enomoto | ............. 198/370.1 X |

* cited by examiner

Primary Examiner—James R. Bidwell
(74) Attorney, Agent, or Firm—Parkhurst & Wendel, L.L.P.

(57) ABSTRACT

An apparatus for supplying raw materials at constant amounts has a raw material tank for storing and feeding raw materials, a belt for transferring raw materials, a level control guide for defining a thickness of raw materials on the belt, and a belt cover. The apparatus further includes a reversible belt drive motor for controlling a rotation direction of the belt forward and backward and a device for removing raw materials arranged at a backward side of the belt. In the case of supplying the raw materials at constant amounts, a normal operation of supplying the raw materials is performed by rotating the belt in a forward direction. In the case of removing the raw materials arranged on the belt and in the raw material tank, the raw materials are transferred to the device for removing raw materials arranged at a backward side of the belt by rotating the belt in a backward direction so as to remove the raw materials from the belt and the raw material tank.

7 Claims, 1 Drawing Sheet

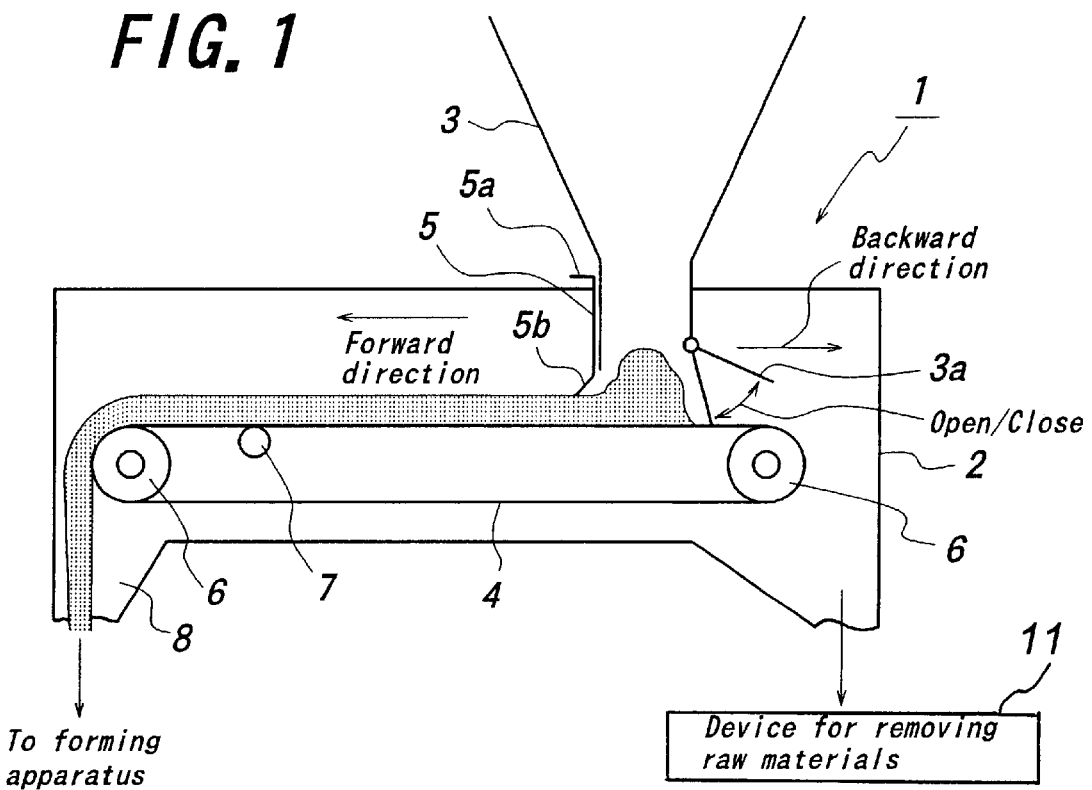
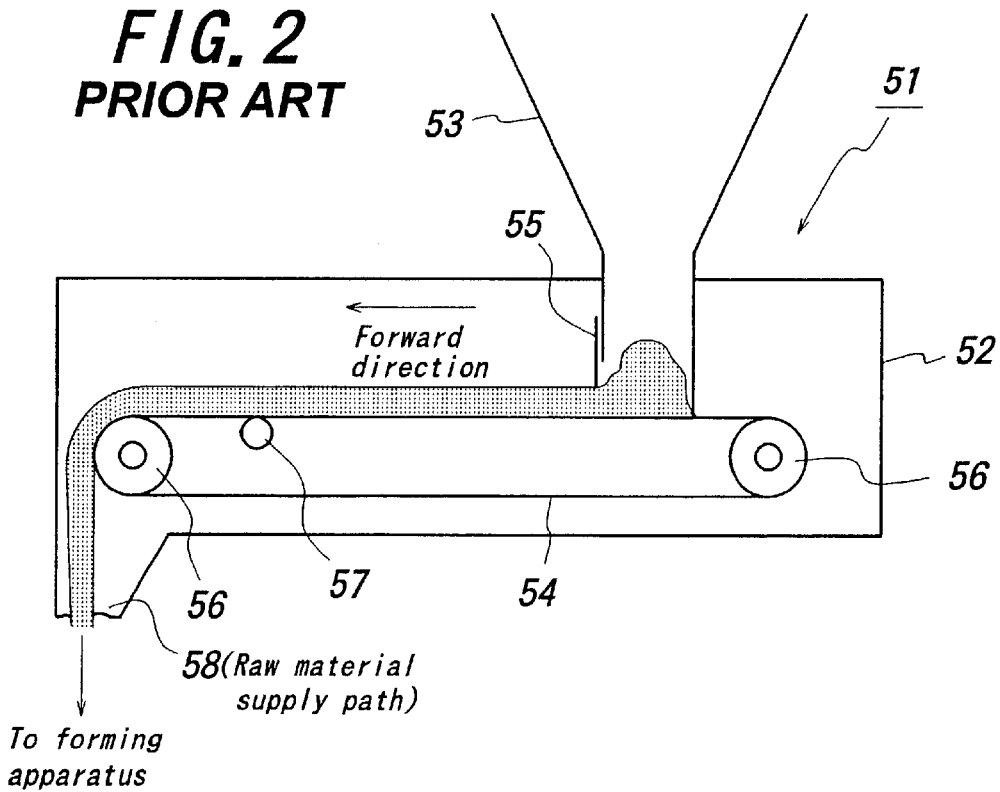

APPARATUS FOR SUPPLYING RAW MATERIALS AT CONSTANT AMOUNTS

BACKGROUND OF THE INVENTION (1) Field of the Invention

The present invention relates to an apparatus for supplying raw materials at constant amounts having a raw material tank for storing and feeding raw materials, a belt for transferring raw materials, a level control guide for defining a thickness of raw materials on the belt, and a belt cover, which can supply at constant amounts wet raw materials used when ceramic honeycombs are extruded.

(2) Prior Art Statement

FIG. 2 is a schematic view showing one embodiment of a known apparatus for supplying raw materials at constant amounts, which can supply at constant amounts wet raw materials used when ceramic honeycombs are extruded. In the embodiment shown in FIG. 2, the apparatus for supplying raw materials at constant amounts 51 comprises a belt 54, belt drive rollers 56 connected to a motor (not shown), a belt cover 52 for covering a roller 57 for measuring a weight of the raw materials on the belt 54 (weight measuring device is not shown) and so on, and a raw material tank 53 for feeding the raw materials arranged through the belt cover 52. The belt 54 functions to transfer the raw materials from the raw material tank 53 to a forming apparatus (not shown). Moreover, a numeral 55 is a level control guide provided to an under portion of the raw material tank 53. A level of the raw materials on the belt 54 can be controlled by varying a position of a tip portion of the level control guide 55 with respect to the belt 54. The level control guide 55 is preliminarily fixed by a bolt and so on to have a predetermined height prior to an apparatus operation start.

In the known apparatus for supplying raw materials at constant amounts 51 having the construction mentioned above, after the level control guide 55 is set, the raw materials such as for example ceramic powders are supplied from the raw material tank 53 on the belt 54 moved in a forward direction. On the belt 54, the supplied raw materials are defined to have a constant width. Therefore, a constant amount of the raw materials can be transferred by setting the level control guide 55. Then, the raw materials are transferred to a raw material supply path 58 for the forming apparatus, which is arranged at a forward side of the belt cover 52. In this manner, the raw material supplying at constant amounts is performed.

In the known apparatus for supplying raw materials at constant amounts 51 having the construction mentioned above, since the belt 54 is moved only in a forward direction, the raw materials to be removed due to a raw material change or a maintenance are once discharged to a forming apparatus side through the raw material supply path 58, and then new raw materials are supplied or a maintenance is performed. In this case, if the raw materials to be removed are supplied to the forming apparatus, it is not possible to perform the raw material supplying at constant amounts. Therefore, in the case of varying the raw materials or in the case of performing the maintenance, the raw materials to be removed are discharged through another path to an outside or the forming apparatus is once detached from the apparatus for supplying at constant amounts.

Moreover, if clods of the raw materials are generated, the clods get stuck on the level control guide 55 and a thickness of the raw materials becomes partly thin, so that it is not possible to perform the raw material supplying at constant amounts. Therefore, it is necessary to make a height of the level control guide 55 higher so as to pass the clods through the level control guide 55. In this case, there is a drawback such that a part of the belt cover 52 is detached. Further, the level control guide 55 is fixed after height adjustment prior to the raw material supplying. Therefore, there occurs a case such that the raw materials are not supplied at constant amounts if a supplying amount of the raw material is varied during operations. In this case, it is also necessary to adjust a height of the level control guide 55 again after the operations are stopped. Moreover, there is a drawback such that a thickness of the raw materials on the belt 54 is varied and thus becomes uneven. Further, there is a drawback such that, since the belt cover 52 is made of non-transparent plate, a raw material state on the belt is not observed, so that a stableness of supplying the raw materials at constant amounts with respect to the clods is not checked.

SUMMARY OF THE INVENTION

An object of the invention is to eliminate the drawback mentioned above and to provide an apparatus for supplying raw materials at constant amounts which can remove the raw materials easily without supplying the raw materials to a forming apparatus, vary a thickness of the raw materials during operations, perform a visual observation of a raw material supplying state and make even a thickness of the raw materials on the belt, even if the raw materials to be removed due to a raw material change or a maintenance are discharged.

According to the invention, an apparatus for supplying raw materials at constant amounts having a raw material tank for storing and feeding raw materials, a belt for transferring raw materials, a level control guide for defining a thickness of raw materials on the belt, and a belt cover, comprises: a reversible belt drive motor for controlling a rotation direction of the belt forward and backward; and a device for removing raw materials arranged at a backward side of the belt; wherein, in the case of supplying the raw materials at constant amounts, a normal operation of supplying the raw materials is performed by rotating the belt in a forward direction, and, in the case of removing the raw materials arranged on the belt and in the raw material tank, the raw materials are transferred to the device for removing raw materials arranged at a backward side of the belt by rotating the belt in a backward direction so as to remove the raw materials from the belt and the raw material tank.

In the present invention, since use is made of a reversible belt drive motor for controlling a rotation direction of the belt forward and backward and a device for removing raw materials arranged at a backward side of the belt, in the case of a raw material change or a maintenance, a belt rotation direction can be reversed and the raw materials to be removed remaining on the belt is supplied to the device for removing raw materials. Therefore, it is possible to remove the raw materials easily without supplying the raw materials to a forming apparatus.

As one preferred embodiment, a door member, which can be opened and closed, is arranged to a part of an under portion of the raw material tank. In this embodiment, during the raw material removing operation, clods do not get stuck on the under portion of the raw material tank if the door member is opened. Therefore, it is possible to perform the raw material removing operation more easily. Moreover, as the another preferred embodiment, inside raw material supplying states are directly observed from the outside by making a part of or an overall part of the belt cover transparent. In this embodiment, it is possible to observe the raw material supplying states on the belt more effectively. Further, as the further another preferred embodiment, an operation portion of the level control guide is arranged outside of the belt cover so as to operate the level control guide from the outside, and a level of the raw materials on the belt is controlled from the outside. In this embodiment, it is possible to control the raw material level from the outside easily. In addition, if a tip portion of the level control guide is inclined at a predetermined angle, it is possible to reduce an unevenness of the raw materials on the belt, and it is possible to perform a smooth raw material supplying operation.

BRIEF DESCRIPTION OF THE DRAWINGS

For a better understanding of the invention, reference is made to the attached drawings, wherein:

FIG. 1 is a schematic view showing one embodiment of an apparatus for supplying raw materials at constant amounts according to the invention; and FIG. 2 is a schematic view illustrating one embodiment of a known apparatus for supplying raw materials at constant amounts.

DETAILED DESCRIPTION OF THE INVENTION

FIG. 1 is a schematic view showing one embodiment of an apparatus for supplying raw materials at constant amounts according to the invention. In the embodiment shown in FIG. 1, the apparatus for supplying raw materials at constant amounts 1 comprises a belt 4, belt drive rollers 6 connected to a motor (not shown), a belt cover 2 for covering a roller 7 for measuring a weight of the raw materials on the belt 4 (weight measuring device is not shown) and so on, and a raw material tank 3 for feeding the raw materials arranged through the belt cover 2. The belt 4 functions to transfer the raw materials from the raw material tank 3 to a forming apparatus (not shown). Moreover, a numeral 5 is a level control guide provided to an under portion of the raw material tank 3. A level of the raw materials on the belt 4 can be controlled by varying a position of a tip portion of the level control guide 5 with respect to the belt 4. A tip portion 5b of the level control guide 5 is inclined at 75° with respect to the level control guide 5. The construction mentioned above is basically same as that of the known apparatus for supplying raw materials at constant amounts, but the drawbacks of the known apparatus are eliminated by improving respective members.

A first feature of the apparatus for supplying raw materials at constant amounts according to the invention is that use is made of a reversible belt drive motor for controlling a rotation direction of the belt 4 forward and backward, and a device for removing raw materials 11 arranged at a backward side of the belt 4. A second feature is that a door member 3a, which can be opened and closed, is arranged at a backward side of the under portion of the raw material tank 3. In order to exhibit a function of the door member 3a more effectively, it is preferred to design the door member 3a to be opened and closed at a position higher than that of the under portion of the level control guide 5. A third feature is that a part of or an overall of the belt cover 2 is made transparent and inside raw material supplying states are directly observed from the outside. A fourth feature is that an operation portion 5a of the level control guide 5 is arranged outside of the belt cover 2 so as to operate the level control guide 5 from the outside.

In the apparatus for supplying raw materials at constant amounts 1 according to the invention having the construction mentioned above, in the case of supplying the raw materials at constant amounts, the level control guide 5 is set at a predetermined height, and then the raw materials such as ceramic powders are supplied from the raw material tank 3 on the belt 4, which is moved in a forward direction. On the belt 4, the supplied raw materials are defined to have a constant width. Therefore, a constant amount of the raw materials can be transferred by setting the level control guide 5 to a predetermined height. Then, the raw materials are transferred to a raw material path 8 for the forming apparatus, which is arranged at a forward side of the belt cover 2. In this manner, the raw material supplying at constant amounts can be performed.

On the other hand, in a raw material removing operation for removing the raw materials on the belt due to a raw material change, a maintenance, and so on, the belt 4, which is stopped due to the raw material change or the maintenance, is moved in a reverse direction i.e. in a backward rotation direction. In this manner, the raw materials to be removed remaining on the belt 4 are supplied to the device for removing raw materials 11. Then, the raw material removing operation is finished when there are no raw materials to be removed on the belt 4. After that, a raw material supplying operation for the next raw materials to be changed starts, or, the maintenance is performed.

In the apparatus for supplying raw materials at constant amounts 1 according to the invention, use is made of the reversible belt drive motor for controlling a rotation direction of the belt 4 forward and backward and the device for removing raw materials 11 arranged at a backward side of the belt 4. Therefore, in the case of the raw material removing operation due to a raw material change or a maintenance, the belt can be moved in a reverse direction i.e. in a backward rotation direction, and the raw materials to be removed remaining on the belt 4 can be supplied to the device for removing raw materials 11. Therefore, it is possible to remove the raw materials on the belt easily without supplying the raw materials to be removed to the forming apparatus. In this manner, it is possible to eliminate a step of removing the raw material removing operation through the forming apparatus.

In the embodiment shown in FIG. 1, the door member 3a, which can be opened and closed, is arranged to a part of the under portion of the raw material tank 3. Therefore, in the raw material removing operation, clods do not stuck on the under portion of the raw material tank 3 if the door member 3a is opened. In this manner, it is possible to perform the raw material removing operation more easily. In order to exhibit a function of the door member 3a more effectively, an opening and closing position of the door member 3a may be higher than a space height between the level control guide 5 and the belt 4. It should be noted that the door member 3a is closed normally so as not to pass the raw materials through a space between the door member 3a and the belt 4. Moreover, an operation portion 5a of the level control guide 5 is arranged outside of the belt cover 2 so as to operate the level control guide 5 from the outside, and a level of the raw materials on the belt 4 is controlled from the outside. Therefore, it is possible to control the raw material level from the outside easily. A height of the level control guide 5 is preliminarily adjusted before the apparatus operation starts. However, it is necessary to vary the height of the level control guide 5, when the raw materials are changed during an apparatus operating condition (flow property of the raw materials is changed), or, when a supplying amount of the raw materials is changed (for example, if decreasing a supplying amount, a moving speed of the belt 4 is decreased, and thus it is necessary to decrease a revolution of the belt drive motor. In this case, the belt drive motor does not rotate at constant speed and rotates intermittently) Under such a condition, according to the invention, since the level control guide 5 can be operated, it is possible to adjust the height of the level control guide 5 without stopping the apparatus operation, and thus a deterioration of utilization rate of the apparatus can be reduced. Further, this is not shown in the embodiment shown in FIG. 1, but, if a part of or an overall part of the belt cover 2 is made transparent, it is possible to observe inside raw materials supplying states directly from the outside. In this embodiment, it is possible to grasp the raw material supplying states at once. Therefore, it is effective since the raw material supplying can be controlled by inspecting directly the raw material supplying states.

The apparatuses for supplying raw materials, in which a shape of the portion 5b of the level control guide 5 was varied as shown in the following Table 1 by examples 1–11, were prepared. In the examples 1–6, the tip portion 5b had a predetermined curvature as shown in Table 1 with respect to the level control guide 5. In the examples 7–11, the tip portion 5b was inclined at a predetermined angle as shown in Table 1 with respect to a surface of the level control guide 5. By utilizing the thus prepared apparatuses, an actual operation was performed respectively. Evenness of a surface of the raw materials on the belt 4 was observed respectively as compared with a reference case such that an actual operation was performed by utilizing the apparatus in which the tip portion 5b had the same surface as that of the level control guide 5. The results were shown in Table 1. In Table 1, a length of the tip portion 5b indicated. Moreover, in Table 1, symbol ○ means a case showing high evenness as compared with the reference case, symbol Δ means a case showing same evenness as compared with the reference case and symbol× means a case showing low evenness as compared with the reference case.

TABLE 1

| Example | Length of tip portion (mm) | Curvature of tip portion (mm) | Angle of tip portion (° C.) | Evenness |
|---|---|---|---|---|
| 1 | 190 | 110 | | Δ |
| 2 | 180 | 100 | | ○ |
| 3 | 100 | 50 | | ○ |
| 4 | 70 | 30 | | ○ |
| 5 | 50 | 20 | | ○ |
| 6 | 40 | 10 | | X |
| 7 | 100 | | 80 | Δ |
| 8 | 100 | | 75 | ○ |
| 9 | 100 | | 60 | ○ |
| 10 | 100 | | 45 | ○ |
| 11 | 100 | | 30 | Δ |

From the results shown in Table 1, in the case of arranging a curvature to the tip portion 5b of the level control guide 5, it is understood that evenness is improved if the tip portion 5b of the level control guide 5 has a curvature of 20–100 mm. In the same way, from the results shown in Table 1, in the case of inclining the tip portion 5b with respect to the level control guide 5, it is understood that evenness is improved if the tip portion 5b is inclined at 45°–75° with respect to the level control guide 5.

As clearly understood from the above explanations, according to the invention, since use is made of a reversible belt drive motor for controlling a rotation direction of the belt forward and backward and a device for removing raw materials arranged at a backward side of the belt, in the case of a raw material change or a maintenance, a belt rotation direction can be reversed and the raw materials to be removed remaining on the belt is supplied to the device for removing raw materials. Therefore, it is possible to remove the raw materials easily without supplying the raw materials to a forming apparatus. Moreover, since the door member is arranged to the under portion of the raw material tank, it is possible to perform the raw material removing operation more effectively. Further, since a part of or an overall part of the belt cover is made transparent, it is possible to observe the raw material supplying states directly and visually. Therefore, the raw material supplying states can be grasped rapidly, and thus it is possible to react an unexpected accident of the raw material supplying operation. Furthermore, since the tip portion of the level control guide is bended, evenness of a surface of the raw materials on the belt can be improved, and thus the raw material supplying operation can be performed stably.

What is claimed is:

1. An apparatus for supplying raw materials at constant amounts having a raw material tank for storing and feeding raw materials, comprising:
    a belt for transferring raw materials; a level control guide for defining a thickness of raw materials on the belt a belt cover
    a reversible belt drive motor for controlling a rotation direction of the belt forward in a downstream direction and backward in an upstream direction;
    a device for removing raw materials located at an upstream end of the belt; and
    a movable part located at an under portion of the raw material tank for movement to a position permitting upstream flow of raw material toward the device for removing raw materials,
    so that the belt is rotatable in a forwad direction for supplying raw materials at constant amounts, the belt is rotatable in a backward direction for removing raw materials located on the belt and in the raw material tank.

2. The apparatus for supplying raw materials at constant amounts according to claim 1, wherein a the movable part has a portion for moving between open and closed positions.

3. The apparatus for supplying raw materials at constant amounts according to claim 1, wherein a the movable part comprises a door member having a pivot at a location higher than that of an under portion of the level control guide, and for pivoting between open and closed positions.

4. The apparatus for supplying raw materials at constant amounts according to claim 1, wherein a tip portion of the level control guide is inclined with respect to a vertical surface.

5. The apparatus for supplying raw materials at constant amounts according to claim 1, wherein a tip portion of the level control guide is inclined at 45°–75° with respect to a vertical surface or is formed with a curvature of 20–100 mm.

6. The apparatus for supplying raw materials at constant amounts according to claim 1, wherein at least a portion of the belt cover is transparent, so that raw material on the belt is directly observable from outside the belt cover.

7. The apparatus for supplying raw materials at constant amounts according to claim 1, wherein an operation portion of the level control guide is located outside of the belt cover for operation of the level control guide from the outside and control of a level of raw materials on the belt.

* * * * *